United States Patent
Hovgaard et al.

(10) Patent No.: US 10,731,632 B2
(45) Date of Patent: Aug. 4, 2020

(54) POWER BOOST OF A WIND TURBINE USING MODEL PREDICTIVE CONTROL

(71) Applicant: VESTAS WIND SYSTEMS A/S, Aarhus N (DK)

(72) Inventors: Tobias Gybel Hovgaard, Ry (DK); Peter Fogh Odgaard, Hinnerup (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 123 days.

(21) Appl. No.: 15/764,454

(22) PCT Filed: Oct. 4, 2016

(86) PCT No.: PCT/DK2016/050319
§ 371 (c)(1),
(2) Date: Mar. 29, 2018

(87) PCT Pub. No.: WO2017/059862
PCT Pub. Date: Apr. 13, 2017

(65) Prior Publication Data
US 2018/0266392 A1    Sep. 20, 2018

(30) Foreign Application Priority Data
Oct. 9, 2015 (DK) ................. 2015 70641

(51) Int. Cl.
*G05B 19/00* (2006.01)
*F03D 7/04* (2006.01)
*F03D 7/02* (2006.01)

(52) U.S. Cl.
CPC .............. *F03D 7/045* (2013.01); *F03D 7/028* (2013.01); *F03D 7/0224* (2013.01);
(Continued)

(58) Field of Classification Search
CPC ........ F03D 7/045; F03D 7/0224; F03D 7/028; F05B 2270/328; F05B 2240/912;
(Continued)

(56) References Cited

U.S. PATENT DOCUMENTS 8,237,301 B2 * 8/2012 Delmerico ............ F03D 7/0284
290/44
8,853,877 B1  10/2014 Zalar et al.
(Continued)

FOREIGN PATENT DOCUMENTS

CN    101560950 A    10/2009
CN    102317622 A    1/2012
(Continued)

OTHER PUBLICATIONS

L. C. Henriksen, M. H. Hansen and N. K. Poulsen, "Wind turbine control with constraint handling: a model predictive control approach," in IET Control Theory & Applications, vol. 6, No. 11, pp. 1722-1734, Jul. 19, 2012. (Year: 2012).*
(Continued)

*Primary Examiner* — Michael D Masinick
(74) *Attorney, Agent, or Firm* — Patterson + Sheridan, LLP

(57) ABSTRACT

The present disclosure relates to a control of a wind turbine in connection with power boosting or fast increase of active power production. A boost command is received (63) and based on the current operational state and the boost level a predicted control trajectory is calculated using a model predictive control (MPC) routine (64). The wind turbine is controlled using the calculated control trajectory during the power boost (65).

16 Claims, 4 Drawing Sheets

(52) U.S. Cl.
CPC ... *F05B 2220/706* (2013.01); *F05B 2240/912* (2013.01); *F05B 2270/1033* (2013.01); *F05B 2270/328* (2013.01); *F05B 2270/404* (2013.01); *Y02E 10/723* (2013.01); *Y02E 10/725* (2013.01); *Y02E 10/728* (2013.01)

(58) Field of Classification Search
CPC .......... F05B 2220/706; F05B 2270/404; F05B 2270/1033; Y02E 10/728; Y02E 10/725; Y02E 10/723
See application file for complete search history.

(56) References Cited

U.S. PATENT DOCUMENTS

| | | |
|---|---|---|
| 2006/0113801 A1 | 6/2006 | Schubert et al. |
| 2010/0283246 A1 | 11/2010 | Christensen |
| 2011/0144816 A1 | 6/2011 | Morjaria et al. |
| 2012/0104753 A1 | 5/2012 | Nakashima et al. |
| 2012/0104756 A1 | 5/2012 | Beekmann et al. |
| 2013/0106107 A1 | 5/2013 | Spruce et al. |
| 2013/0257051 A1 | 10/2013 | Spruce et al. |
| 2016/0053745 A1* | 2/2016 | Blom ...................... F03D 7/045 416/1 |
| 2017/0051723 A1* | 2/2017 | KJ R ...................... F03D 7/0284 |
| 2017/0089325 A1* | 3/2017 | Timbus ................ F03D 7/0292 |
| 2018/0142674 A1* | 5/2018 | Hammerum .......... F03D 7/0292 |
| 2018/0171977 A1* | 6/2018 | KJ R ...................... H02J 3/386 |

FOREIGN PATENT DOCUMENTS

| | | |
|---|---|---|
| CN | 102536657 A | 7/2012 |
| CN | 102619685 A | 8/2012 |
| CN | 102797631 A | 11/2012 |
| CN | 104533714 A | 4/2015 |
| EP | 2644887 A2 | 10/2013 |
| EP | 2784303 A1 | 10/2014 |
| EP | 2878811 A1 | 6/2015 |
| KR | 101545839 B1 | 8/2015 |
| WO | 2014121974 A1 | 8/2014 |

OTHER PUBLICATIONS

Chinese Office Action for Application No. 2016800655833 dated Apr. 12, 2019.

Chinese Office Action for Application No. 2017800266 dated Aug. 20, 2019.

Patent Cooperation Treaty International Search Report for Application No. PCT/DK2016/050319 dated Dec. 14, 2016.

Baccion, et al., "An Optimal Model-Based Control Technique to Improve Wind Farm Participation to Frequency Regulation," IEEE Transactions on Sustainable Energy, vol. 6, No. 3, Jul. 2015, 12 pages.

Hovgaard et al., "MPC for Wind Power Gradients-Utilizing Forecasts, Rotor Inertia, and Central Energy Storage," 2013 European Control Conference (ECC), Jul. 17-19, 2013, 6 pages.

Danish Patent and Trademark Office Search Opinion for Application No. PA 2015 70641 dated May 18, 2016.

* cited by examiner

POWER BOOST OF A WIND TURBINE USING MODEL PREDICTIVE CONTROL

FIELD OF THE INVENTION

The invention relates to control of a wind turbine, particularly in connection with power boosting or fast increase of active power production.

BACKGROUND OF THE INVENTION

As the penetration of wind energy increases in the electrical grids there may be a need or desire that wind turbines should contribute to the stability of the electrical grids. In some electric grids there may even be requirements in the form of grid codes on how wind turbines should contribute to stabilising the grid.

In a wind turbine the kinetic energy stored in the rotating system may be used for grid stabilization. This is sometimes referred to as the wind turbine may provide inertial response. The stored kinetic energy may be used to boost the generated power from the normal production for a short period of time, i.e. power delivered to the electrical grid is increased while the stored kinetic energy decreases, resulting in a slowdown of the rotor.

A boost can be provided in different ways, but it typically comprises a boost period where the generated power is increased as compared to the pre-boost period (or normal production period) followed by a recovery period, where the kinetic energy in the rotor is build up again to the pre-boost level. The size of the boost, duration of the boost, as well as constraints of the recovery period may be formalized in grid codes or other requirements. An example of a boost requirements, may be that the wind turbine has to be able to deliver a power boost of 5-10% of rated power for a given time period, e.g. up to 10 seconds, and that the turbine must have returned to normal operation after 2 minutes without going below 20% of the pre-boost power level.

It is against this background that the invention has been devised.

SUMMARY OF THE INVENTION

It would be advantageous to provide improved control of a wind turbine during increased power production for a short period of time, i.e. during boost. In particular it would be advantageous to provide further ways of controlling a wind turbine during the entire boost period, including both the boost period and the recovery period.

Accordingly, in a first aspect, there is provided a method of controlling a wind turbine, comprising:
  receiving a boost command to request a power boost to increase the electrical power production, the boost command comprises a boost level;
  receiving a current operational state of the wind turbine;
  based on the current operational state and the boost level, calculate one or more predicted operational trajectories using a model predictive control (MPC) routine, the one or more predicted operational trajectories include a predicted control trajectory, where a trajectory comprises a time series of at least one variable;
  control the wind turbine using the control trajectory during the power boost.

In the present invention, the operation of the turbine is based on a calculated control trajectory. A trajectory is a time series of a variable for a given time slot, which includes the next variable value for the operational parameter related to the variable, as well as a predicted or an expected number of future variable values for the given parameter. For example, the control trajectory may be a pitch trajectory which includes the next pitch command, as well as an expected or a predicted number of future pitch commands.

The one or more predicted operational trajectories are calculated by using a receding horizon control routine in the form of a model predictive control (MPC) routine. It is an advantage to calculate the control trajectory during boost using an MPC algorithm, since MPC algorithms are well suited for calculating an operational trajectory based on the actual state of the wind turbine. MPC algorithms take constraints on the system variables directly into account and can thereby advantageously be used to find optimal operational trajectories within safe operational limits, not just for the current control set-points but also for future set-points.

In a boosting situation, the turbine leaves normal operation and might leave optimal operation in terms of operation to achieve maximum effective output power corresponding to the respective wind conditions. It is advantageous to control the turbine based on an MPC controller in such a situation, since optimal operation can be ensured under the given boost conditions and it can be ensured that the wind turbine stays within operation limits, not just for the current time instance, but also through-out the entire prediction horizon.

The increase in the electrical power production during the boosting may be based on kinetic energy stored in the rotating system, i.e. kinetic energy stored in the rotor inertia. Consequently, the rotor may slow down during the boost period. Boosting the electrical power production based on kinetic energy stored in the rotating system, allows for boosting in situations where there is not enough energy in the wind to generate the boosting power. Increased power production based on rotor inertia does not increase fatigue loads on rotor and tower, but is only possible for a limited period of time.

In an embodiment, an optimization may be made which during the boosting period also takes into account the recovery period. While controlling the turbine during the power boost, it is ensured that the turbine gets through the recovery period in an optimal way with minimal impact on the power production.

Further embodiments are described in connection with the section Description of embodiments.

In further aspects, the invention also relates to a computer program product comprising software code adapted to control a wind turbine when executed on a data processing system, to a control system for a wind turbine, and to a wind turbine being controlled in accordance with any of the various aspects of the present invention.

The computer program product may be provided on a computer readable storage medium comprising instructions to cause a data processing system, e.g. in the form of a controller, to carry out the instruction when loaded onto the data processing system.

The control system, the method of controlling and/or the computer program product may be at least partly implemented in wind turbine park controller which is arranged to control at least selected turbines of the wind turbine park. A wind turbine park controller may also be referred to as a power plant controller PPC.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
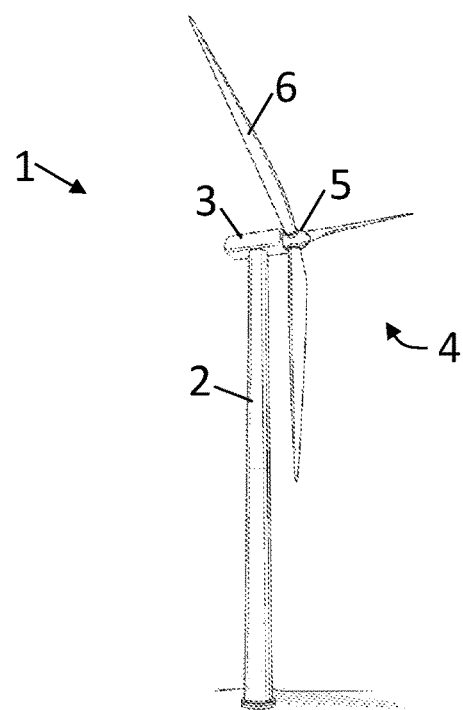
FIG. 1 illustrates, in a schematic perspective view, an example of a wind turbine.

FIG. 1 illustrates, in a schematic perspective view, an example of a wind turbine 1. The wind turbine 1 includes a tower 2, a nacelle 3 disposed at the apex of the tower, and a rotor 4 operatively coupled to a generator housed inside the nacelle 3. In addition to the generator, the nacelle houses miscellaneous components required for converting wind energy into electrical energy and various components needed to operate, control, and optimize the performance of the wind turbine 1. The rotor 4 of wind turbine includes a central hub 5 and a plurality of blades 6 that project outwardly from the central hub 5. In the illustrated embodiment, the rotor 4 includes three blades 6, but the number may vary. Moreover, the wind turbine comprises a control system. The control system may be placed inside the nacelle or distributed at a number of locations inside (or externally to) the turbine and communicatively connected.

The wind turbine 1 may be included among a collection of other wind turbines belonging to a wind power plant, also referred to as a wind farm or wind park that serves as a power generating plant connected by transmission lines with a power grid. The power grid generally consists of a network of power stations, transmission circuits, and substations coupled by a network of transmission lines that transmit the power to loads in the form of end users and other customers of electrical utilities. The wind power plant may comprise a power plant controller which may be in charge of controlling certain aspects of the individual turbines.

Figure 2:
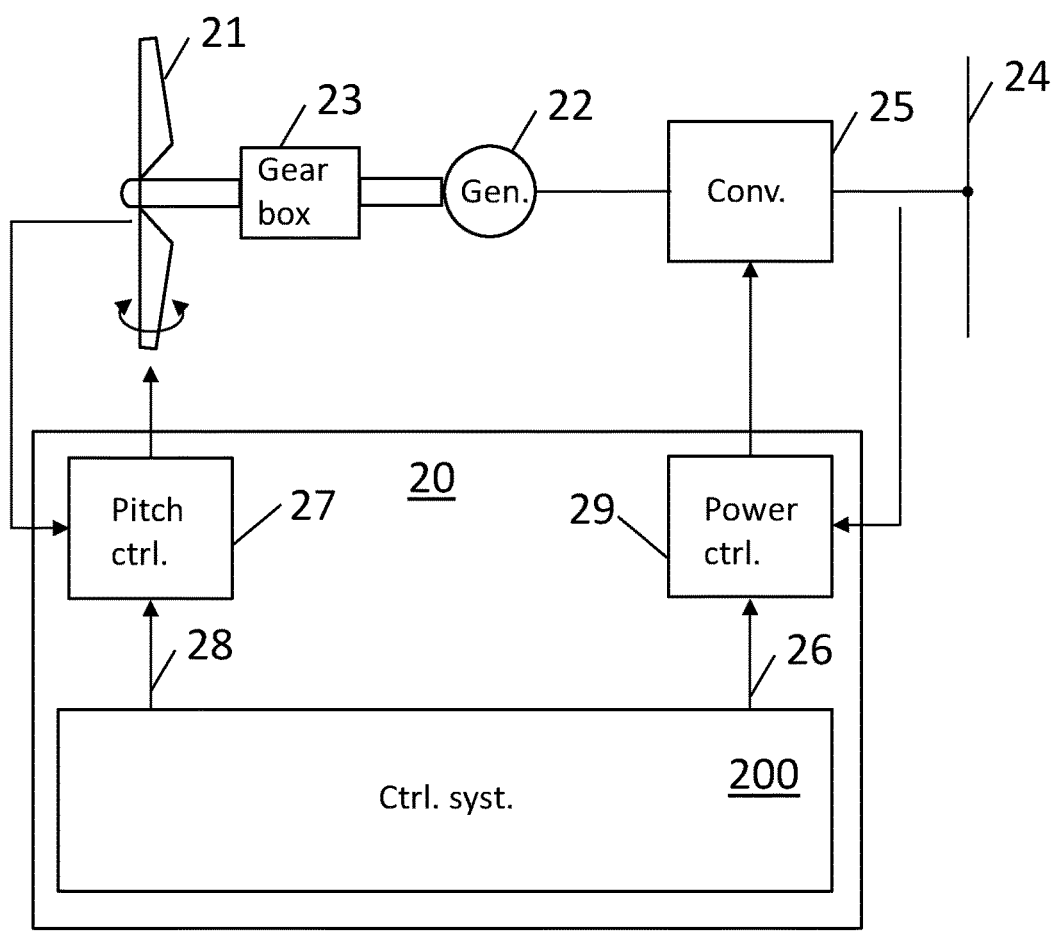
FIG. 2 illustrates an embodiment of a control system together with elements of a wind turbine.

FIG. 2 schematically illustrates an embodiment of a control system 20 together with elements of a wind turbine. The wind turbine comprises rotor blades 21 which are mechanically connected to an electrical generator 22 via gearbox 23. In direct drive systems, and other systems, the gear box may not be present. The electrical power generated by the generator 22 is injected into a power grid 24 via an electrical converter 25. The electrical generator 22 can be a doubly fed induction generator, but other generator types may be used.

The control system 20 comprises a number of elements, including at least one controller 200 with a processor and a memory, so that the processor is capable of executing computing tasks based on instructions stored in the memory.

In general, the wind turbine controller ensures that in operation the wind turbine generates a requested power output level. This is obtained by adjusting the pitch angle and/or the power extraction of the converter. To this end, the control system comprises a pitch system including a pitch controller 27 using a pitch reference 28, and a power system including a power controller 29 using a power reference 26. The wind turbine rotor comprises rotor blades that can be pitched by a pitch mechanism. The rotor may comprise a common pitch system which adjusts all pitch angles on all rotor blades at the same time, as well as in addition thereto an individual pitch system which is capable of individual pitching of the rotor blades. The control system, or elements of the control system, may be placed in a power plant controller (not shown) so that the turbine may be operated based on externally provided instructions.

In embodiments of the invention, the control system 200 implements a model predictive control (MPC) routine which is programmed to receiving a current operational state of the wind turbine. Based on the current operational state, one or more predicted operational trajectories are calculated including at least one predicted operational trajectory, which normally at least includes pitch set-point 28 and a power set-point 26.

Figure 3:
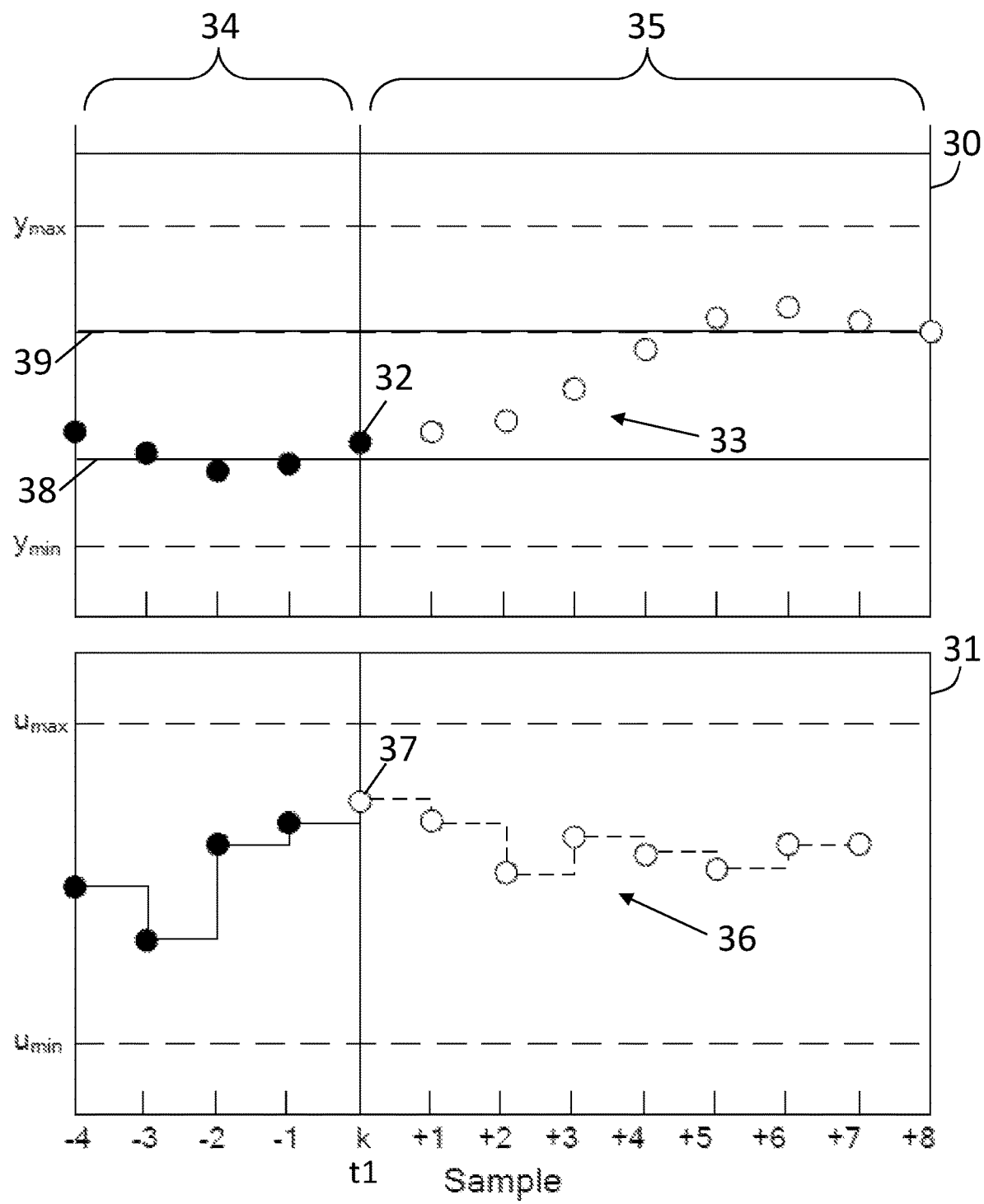
FIG. 3 shows general aspects of an MPC routine in relation to a measured operational variable y and an MPC calculated control variable u.

FIG. 3 shows general aspects of an MPC routine in relation to a measured operational variable y and an MPC calculated control variable u in a boost situation. The upper part 30 of the figure shows a state trajectory for the variable y and the lower part 31 of the figure shows a control trajectory for the control variable u.

The operational trajectories and control trajectories may include, but are not limited to, one or more of the following parameters: pitch value, including collective pitch values and individual pitch values, rotor speed, rotor acceleration, tower movement, power related parameters, torque related parameters and derivatives of these parameters, as well as to such parameters as generated power Pg, power extracted from the wind Pw, available power in the wind Pav, and the kinetic energy in the rotating system K.

In an embodiment, the operational trajectory is a predicted operational state trajectory. A state is a collection, often expressed as a vector, of operational parameters. An example wind turbine state is:

$$x^* = \begin{bmatrix} \theta(t) \\ \dot{\theta}(t) \\ \omega(t) \\ \dot{\omega}(t) \\ s(t) \\ \dot{s}(t) \\ \ddot{s}(t) \end{bmatrix}$$

comprising pitch value, $\theta$, rotor angular speed, $\omega$, and tower top position, s, as well as time derivatives of those parameters. Other and more parameters may be used to define the wind turbine state, $x^*$. In general the operational trajectory includes operational parameters which are used to calculate the desired fatigue load measure.

The state values of the current operational state of the wind turbine may be based on measured sensor readings from sensors arranged to measure sensor data relating to the wind turbine's physical state values. Additionally, estimated values or calculated values may also be used. In an embodiment, the state may be determined by a state calculator, e.g.

in the form of a dedicated computational unit in charge of determining the current operational state, such as an observer or a Kalman filter.

The trajectory may also be expressed as a control trajectory. An example control trajectory may be:

$$u_1^* = \begin{bmatrix} \theta_{ref} \\ P_{ref} \end{bmatrix}$$

comprising the pitch reference signal and the power reference signal. Other and more parameters may be used to define the wind turbine control signal, $u_1^*$.

FIG. 3 shows a trajectory 33 of a measured variable y for a number of discrete time steps. The figure shows the current time, k, as well as a number of past time steps 34 and a number of future time steps 35 (also referred to as the prediction horizon and the control horizon for the state variable y and the control variable u, respectively). Known variable values, i.e. based on already measured values, are marked with a solid circle, whereas predicted variable values are marked with an open circle. A trajectory may comprise a time series of predicted values, i.e. only the open circles. The trajectory need not include the past and known values, but may do in certain embodiments. In particular, the current value 32 may be included for trajectories of measured variables. The trajectory may span a time series of a few seconds, such as 5-10 seconds. However the trajectory may be longer or shorter depending on the given implementation.

As an example, the trajectory shows the generated power Pg in a situation where a boost command is given at time t1, i.e. sample k, to increase the output power from a pre-boost level 38 to a boost level 39. The trajectory shows the current generated power level 32 together with the predicted future power levels. Allowed maximum and minimum values are also shown for the illustrated variable.

FIG. 3 further illustrates an example of a general control trajectory 36 determined by use of an MPC algorithm. FIG. 3 illustrates the relationship between an operational state trajectory 33 and a general control trajectory 36.

While the current k-th value is known for measured variables 32, the current value 37 of the control trajectory is calculated by use of the MPC routine.

The figure also shows maximum and minimum allowed values for the control trajectory values of u.

As an example, the trajectory shows the trajectory for the pitch angle, i.e. u=θ. In the example, based on a received boost command, the MPC algorithm determines relevant set-points, such as a power set-point for the converter to increase the generated power. As a consequence the pitch angle is lowered. The trajectory shows the next pitch setting 37 together with the predicted future pitch settings to fulfil the new set-point setting.

MPC is based on iterative, finite horizon optimization. At time t the current state is sampled and a cost minimizing control strategy is computed for a time horizon in the future: [t, t+T]. Only the first predicted value for the current sample k is used in the control signal, then the turbine state is sampled again and the calculations are repeated starting from the new current state, yielding a new control trajectory and new predicted state trajectory. The prediction horizon keeps being shifted forward and for this reason MPC is a receding horizon controller.

Model Predictive Control (MPC) is a multivariable control algorithm that uses an optimization cost function J over the receding prediction horizon, to calculate the optimal control moves.

The optimization cost function may be given by:

$$J = \sum_{i=1}^{N} w_{y_i}(r_i - y_i)^2 + w_{u_i}\Delta u_i^2$$

With reference to FIG. 3, $r_i$ is the set-point for the i-th variable, $y_i$ and $u_i$ being i-th trajectory variables, and $w_{y_i}$ being weight matrix defining the relative importance of this variable, and $w_{u_i}$ being weight matrix defining the penalty related to changes in this variable.

Figure 4:
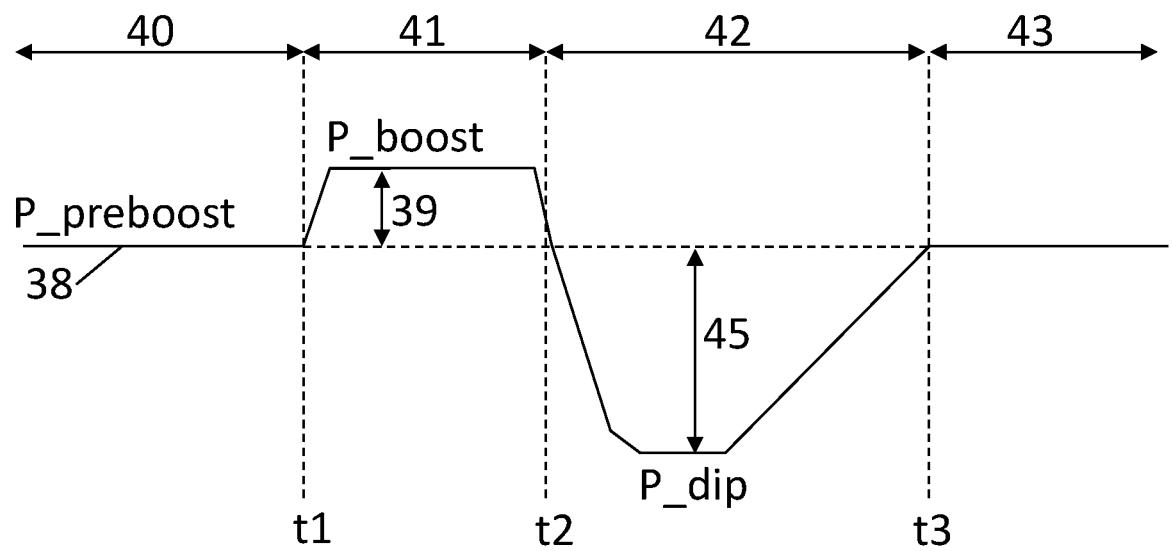
FIG. 4 shows an example of a boost, including the boost period and the recovery period.

FIG. 4 shows an example of a boost. The figure shows four periods, a pre-boost period 40, corresponding to normal operation in accordance with the given operational conditions. At time t1 a boost command is received, the boost command requests a power boost to increase the electrical power production resulting in that the electrical power production is increased from a pre-boost level, P_preboost, to a specified boost level, P_boost, 39 during a boost period 41. During the boost period, the power increase is based on kinetic energy stored in the rotation. The boost period ends at t2, after which the turbine enters a recovery period 42 where the lost kinetic energy in the rotation is regained. During the recovery period 42 the generated power is reduced 45 to a power level referred to as P_dip. This reduction is often referred to as the power dip. After the recovery period, normal operation is resumed.

In an embodiment, a controller of a wind turbine receives a boost command, the boost command comprising a boost level (P_boost). Together with receiving the boost command, the controller receives or accesses a current operational state of the wind turbine. Based on the current operational state and the boost level, one or more predicted operational trajectories are calculated using a model predictive control (MPC) routine, and the wind turbine is controlled using the control trajectory during power boost.

The boost level may be defined in different ways, e.g. as a given value, as a percentage of the pre-boost power (or current generated power), as a percentage of the power available in the wind, or by any other suitable means.

Figure 5:
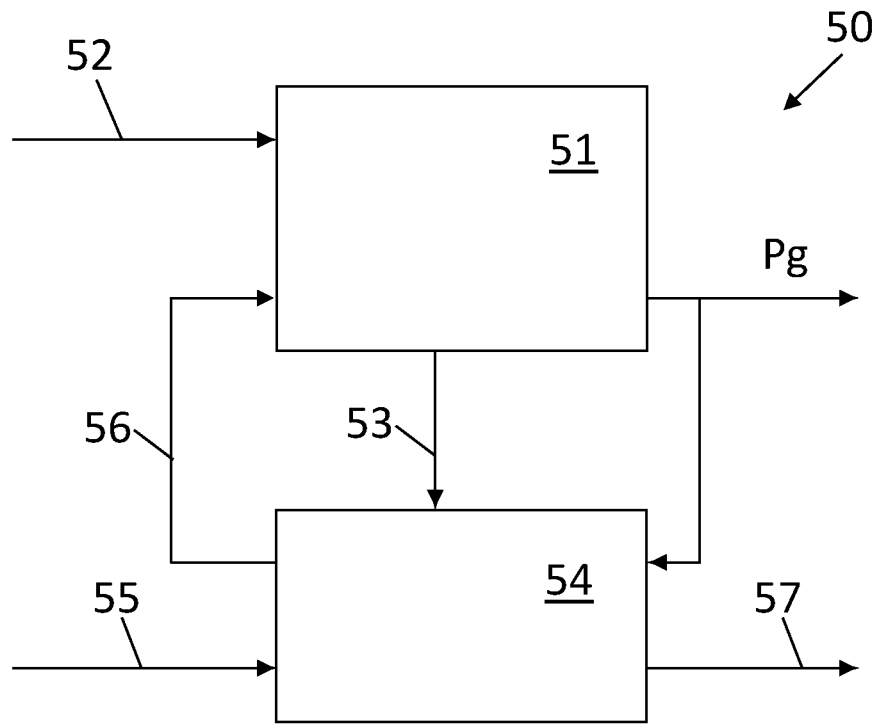
FIG. 5 illustrates a schematic overview of a controller structure in accordance with embodiments of the present invention.

FIG. 5 illustrates a schematic overview of elements of a control system 50 in accordance with embodiments of the present invention. This controller structure may e.g. be implemented in the controller 200 shown on FIG. 2.

The control system 50 may include a controller unit in the form of an MPC module 51 which receives a current operational state 52 of the wind turbine and based on the current operational state calculate one or more predicted operational trajectories 53 using a model predictive control (MPC) routine, hereunder a predicted control trajectory including the generated power Pg.

The control system may also comprise a controller unit in the form of a boost module 54 which is implemented to receive a boost command 55 and forward this boost command to the MPC controller 51. The forwarded boost command 56 may be in the form of a minimum requested generated power.

The boost command 55 may be requested based on a detected change of a system operating parameter of the energy distribution system. For example, the boost command may be triggered by a detected frequency decrease in the grid. The boost command may also be received from an external operating system, such as a grid operator system which implements a routine to stabilize the grid.

In an embodiment the electrical power production is increased (boosted) by imposing one or more constraints in the model predictive control routine.

In an embodiment, the boost functionality is implemented by imposing a minimum value of the requested generated power (Pg) as a constraint in the model predictive control routine.

In an embodiment a first minimum value 39 of the requested generated power (Pg) is imposed as a constraint in the model predictive control routine during the boost period 41, and a second minimum value 45 of the requested generated power (Pg) is imposed as a constraint in the model predictive control routine during the recovery period 42. The first minimum value may be defined by the boost level and the second minimum value may be defined by a minimum allowed generated power.

In the second minimum value, the power level may not be directly defined as a minimum power level but may be set indirectly from a requirement of not dropping more than a certain percentage relative to the pre-boost power level.

Moreover, the min power constraint in the recovery period may be chosen as the minimum of not dropping below a certain power level, Pgmin, and the maximum generator power level which still ensures acceleration of the rotor.

For example:

During the boost period: $Pgmin=P\_preboost+P\_boost$, and

During recovery: $Pgmin=\min(P\_preboost-P\_dip, Pg\_acc)$ where Pg_acc is the maximum Pg allowed in order to ensure an acceleration of the rotor. For a given time instance k, $Pg\_acc<\alpha*(Pw[k]+K[k+1]-K[k])$, where $\alpha$ is a parameter smaller than 1 which is used to control the recovery time needed, and Pw is the power extracted from the wind.

It is an advantage to increase the electrical power production by use of a constraint in the form of a minimum value, possibly together with also basing the power level during the recovery period on a constraint in the form of a (second) minimum value. This is an advantage since constraints are integral elements of an MPC routine and thereby the boosting can be can be handled in a simple manner by constraint handling.

The time series of the one or more predicted operational trajectories 33 may span at least a part of the entire boost period. This may advantageously be used to ensure that the turbine can support continued boosting at least during the prediction horizon or known part of it. In an embodiment a time slot of at least one predicted operational trajectory is compared to a termination criterion. In this manner the boost period may be terminated if the at least one predicted operational trajectory meet the termination criterion in the time slot. As an example a minimum kinetic energy level Kmin, a minimum rotational speed ω min, or other termination criteria may be set. As an example, if the kinetic energy decreases below the minimum level for a pre-specified number of samples in the prediction horizon, the boost period is terminated, and the recovery period is initiated. In this manner it can be ensured that the boost period is not extended longer than it can actually recover from during the recovery period.

In an embodiment a maximum boost period is determined based on the predicted kinetic energy in the rotor. In this embodiment, at least one of the predicted operational trajectories is the predicted kinetic energy in the rotor. In this embodiment a maximum boost period may be determined as the time period corresponding to the duration of the time series where the predicted kinetic energy in the rotor is larger than a predetermined value. The maximum boost period may be output from the boost module 54 as a signal 57 to be used e.g. by a power plant controller or a system operator.

The predetermined value which the predicted kinetic energy should be larger than may be determined based on available power in the wind as predicted by the model predictive control routine. In this way it may be ensured that the available power in the wind is equal or larger than the needed available power for returning the wind turbine to the pre-boost power production level.

To compute the maximum boost period left (Tleft), given the Pgmin value and the current wind speed and generator speed/kinetic energy, a vector, Kpred, with the predicted kinetic energy over the prediction horizon may be provided. The element numbers in the vector correspond to the time step in the prediction, i.e., the third element is the prediction 3 time steps ahead. In an embodiment the period Tleft may be computed from the element in Kpred corresponding to the longest prediction for which $K>Kmin*\gamma$, where $\gamma$, is a parameter to adjust for uncertainties in the prediction and Kmin is computed as the minimum value of K which fulfills:

$$Pav(V,Kmin)-Ploss>P\_preboost-P\_dip,$$

Pav is a function (implemented in the MPC) computing the available power as a function of the wind speed and the kinetic energy, K. The element Ploss may be included to take into account the electrical and mechanical power losses in the drivetrain and the generator. Ploss may in embodiments also be predicted by the MPC.

In an embodiment a boost capacity may be computed as $1-Tb/(Tb+Tleft)$, where Tb is the time currently spent in a boost. The boost capacity may be output from the boost module 54 as a signal 57 to be used e.g. by a power plant controller or a system operator. A low boost capacity corresponds to a high risk of a too low rotor speed. The boost capacity may be calculated in other ways. As a further example it may be given as the result of the minimum function min(1, Tleft/Tboost), where Tboost is a predefined boost length. In this embodiment the output indicates either that the entire predefined boost length can be provided or only a fraction of it. In an embodiment a termination criterion may be defined as a threshold value of the boost capacity is used to terminate the boost period and enter the recovery phase.

Due to the MPC routine being a receding horizon routine, any parameter including the minimum period and the boost capacity may be repeatedly calculated during the boost period. This is advantageous since in this manner it can be ensured that for the next period (the prediction horizon) the turbine does not enter an operational state from which it cannot recover from, better control of the boost may thereby be obtained.

In an example embodiment, the optimization problem used for the boost period has the form:

$$u^*(t)=\operatorname{argmin} J_0(S(t),P(t),u(t)),$$

subject to a set of constraints.

During normal operation/pre-boost operation, example constraints may be given in terms of such parameters as the rated rotor speed ($\omega_R$) should be below a given limit value $\Gamma_{\omega_R}$, and that pitch angle $\theta_i$ (with derivative) should be within given limit values for each blade i. Moreover, a constraint is set that the generated power Pg should be below the rated power Pr.

$$\omega_R \leq \Gamma_{\omega_R}$$

$$-5 \leq \theta_i \leq 90, i \in \{1,2,3\}$$

$$-20 \leq \dot{\theta}_i \leq 20, i \in \{1,2,3\}$$

$$P_g \leq P_r$$

During power boost 41, the power constraint changes to:

$$P\_preboost + P\_boost \leq Pg \leq Pr + P\_boost$$

Whereas during the recovery period 42, the power constraint is set to:

$$P\_preboost - P\_dip \leq Pg \leq Pr$$

The function argmin is the standard mathematical operator which stands for argument of the minimum, and finds points in the parameter space spanned by S, P, u and t where the cost function $J_0$ attains its smallest value.

Here, the nominal cost function $J_0$ provides a trade-off between power (P) and loads (S) using the control signal u(t), while the constraints limit the rotor speed, blade pitch angle, blade pitch speed, and electrical power. The control signal would typically consist of blade pitch angles and power reference for the converter:

$$u(t) = \begin{bmatrix} \theta_1(t) \\ \theta_2(t) \\ \theta_3(t) \\ P_{ref}(t) \end{bmatrix}$$

Figure 6:
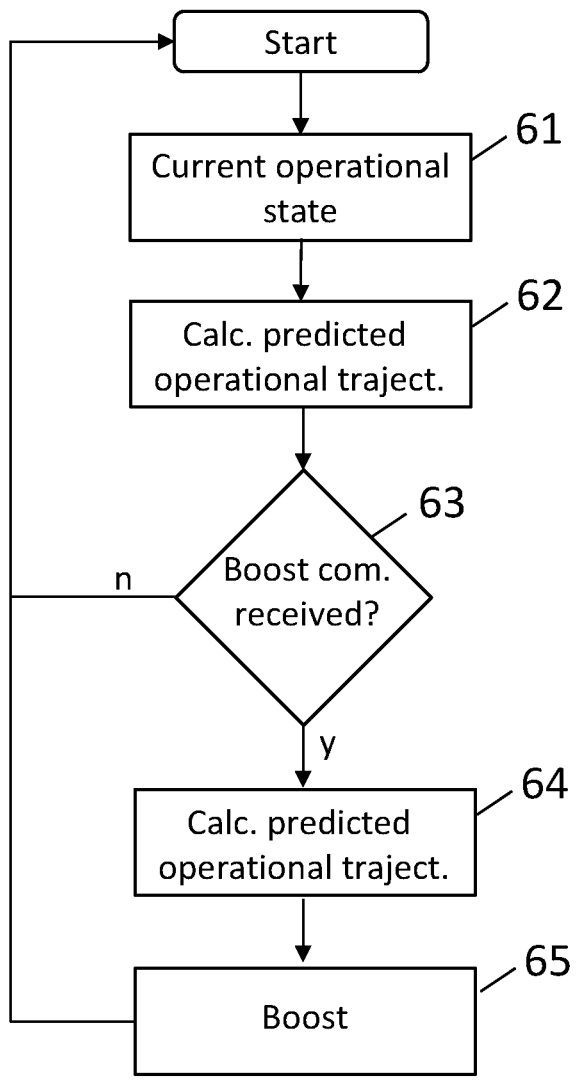
FIG. 6 illustrates elements of a flow diagram showing steps used to control a wind turbine to perform various embodiments of the present invention.

FIG. 6 illustrates elements of a flow diagram showing steps used to control a wind turbine to perform various embodiments of the present invention.

The elements may be implemented as computer program product or code being adapted to generating instructions to a controller arranged to control the operation of the wind turbine or components of the wind turbine. The computer program may be provided in any suitable manner. The computer program product is typically stored by and executed by a wind turbine control system or by an external controller such as a power plant controller.

In a first step 61, the current operational state of the wind turbine is determined or received. The current operational state of the wind turbine is normally constantly updated in connection with general control of the turbine. In a normal situation, based on the current operational state, one or more predicted operational trajectories are calculated 62.

In embodiments of the present invention, a boost command 63 is received to request a power boost to increase the electrical power production. Subsequently, based on the current operational state and the boost level, one or more predicted operational boost trajectories are calculated 64. The predicted operational trajectories include at least one control trajectory to be used to control the wind turbine during power boost, i.e. to boost 65.

Although the present invention has been described in connection with the specified embodiments, it should not be construed as being in any way limited to the presented examples. The invention can be implemented by any suitable means; and the scope of the present invention is to be interpreted in the light of the accompanying claim set. Any reference signs in the claims should not be construed as limiting the scope.

The invention claimed is:

1. A method of controlling a wind turbine, the method comprising:
   receiving a boost command to request a power boost to increase an electrical power production of the wind turbine;
   using a model predictive control (MPC) routine:
   calculating at least one predicted operational trajectory based on a current operational state of the wind turbine and a boost level of the boost command, the predicted operational trajectory comprising a time series of at least a first variable, wherein the least one predicted operational trajectory comprises a predicted kinetic energy in a rotor of the wind turbine; and
   calculating at least one predicted control trajectory based on the predicted operational trajectory, the predicted control trajectory comprising a time series of at least a second variable, wherein during the power boost, the at least one predicted operational trajectory and the at least one predicted control trajectory are repeatedly calculated as receding horizon trajectories;
   controlling the wind turbine using a last calculated control trajectory of the at least one predicted control trajectory during the power boost; and
   determining a maximum boost period as a time period corresponding to a duration of the time series where the predicted kinetic energy in the rotor is larger than a predetermined value.

2. The method according to claim 1, wherein the electrical power production of the wind turbine is increased by imposing one or more constraints in the MPC routine.

3. The method according to claim 1, wherein the electrical power production of the wind turbine is increased by imposing a minimum value of a requested generated power (Pg) as a constraint in the MPC routine.

4. The method according to claim 1, wherein the power boost comprises a boost period, during which the electrical power production is increased and a rotor of the wind turbine is decelerated, followed by a recovery period where the electrical power production drops and the rotor is accelerated, wherein the method further comprises:
   increasing the electrical power production by imposing a first minimum value of a requested generated power (Pg) as a constraint in the MPC routine during the boost period, the first minimum value being defined by the boost level; and
   imposing a second minimum value of the requested generated power (Pg) as a constraint in the MPC routine during the recovery period, the second minimum value being defined by a minimum allowed generated power.

5. The method according to claim 1, wherein the time series of the at least one predicted operational trajectory spans at least a part of an entirety of the boost period, and wherein a time slot of the at least one predicted operational trajectory is compared to a termination criterion, and wherein the boost period is terminated if the at least one predicted operational trajectory meets the termination criterion in the time slot.

6. The method according to claim 1, wherein the power boost is based on kinetic energy stored in a rotor of the wind turbine.

7. The method according to claim 1, further comprising:
   determining the predetermined value based on available power in the wind predicted by the MPC routine such that that the available power in the wind is equal to or larger than a needed available power to return the wind turbine to a pre-boost power production level.

8. The method according to claim 1, further comprising: terminating the boost period when the maximum boost period is shorter than a minimum period.

9. The method according to claim 8, further comprising: repeatedly calculating the minimum period during the boost period.

10. The method according to claim 1,
wherein the wind turbine is included in an energy distribution system, and
wherein the boost command is received responsive to detecting a change of a system operating parameter of the energy distribution system.

11. The method according to claim 1, wherein the boost command is received from an external operating system.

12. The method according to claim 1, further comprising: obtaining the current operational state of the wind turbine based on sensor readings from sensors arranged to measure sensor data relating to a physical state of the wind turbine.

13. A computer program product comprising software code adapted to control a wind turbine when executed on a data processing system, the computer program product being adapted to perform an operation, comprising:
receiving a boost command to request a power boost to increase an electrical power production of the wind turbine;
using a model predictive control (MPC) routine:
calculating at least one predicted operational trajectory based on a current operational state of the wind turbine and a boost level of the boost command, the predicted operational trajectory comprising a time series of at least a first variable, wherein the least one predicted operational trajectory comprises a predicted kinetic energy in a rotor of the wind turbine; and
calculating at least one predicted control trajectory based on the predicted operational trajectory, the predicted control trajectory comprising a time series of at least a second variable, wherein during the power boost, the at least one predicted operational trajectory and the at least one predicted control trajectory are repeatedly calculated as receding horizon trajectories;
controlling the wind turbine using a last calculated control trajectory of the at least one predicted control trajectory during the power boost; and
determining a maximum boost period as a time period corresponding to a duration of the time series where the predicted kinetic energy in the rotor is larger than a predetermined value.

14. The computer program product of claim 13, wherein the power boost comprises a boost period, during which the electrical power production is increased and a rotor of the wind turbine is decelerated, followed by a recovery period where the electrical power production drops and the rotor is accelerated, wherein the operation further comprises:
increasing the electrical power production by imposing a first minimum value of a requested generated power (Pg) as a constraint in the MPC routine during the boost period, the first minimum value being defined by the boost level; and
imposing a second minimum value of the requested generated power (Pg) as a constraint in the MPC routine during the recovery period, the second minimum value being defined by a minimum allowed generated power.

15. A control system for a wind turbine, the control system comprising:
a first controller unit configured to receive a boost command, the boost command comprising instructions to request a power boost for increasing an electrical power production of the wind turbine; and
a second controller unit configured to, using a model predictive control (MPC) routine:
calculate at least one predicted operational trajectory based on a current operational state of the wind turbine and a boost level of the boost command, the predicted operational trajectory comprising a time series of at least a first variable, wherein the least one predicted operational trajectory comprises a predicted kinetic energy in a rotor of the wind turbine;
calculate at least one predicted control trajectory based on the predicted operational trajectory, the predicted control trajectory comprising a time series of at least a second variable, wherein during the power boost, the at least one predicted operational trajectory and the at least one predicted control trajectory are repeatedly calculated as receding horizon trajectories; and
control the wind turbine using a last calculated control trajectory of the at least one predicted control trajectory during the power boost,
wherein the first controller unit is further configured to determine a maximum boost period as a time period corresponding to a duration of the time series where the predicted kinetic energy in the rotor is larger than a predetermined value.

16. A wind turbine, comprising:
a tower;
a nacelle disposed on the tower; and
a control system configured to:
receive a boost command, the boost command comprising instructions to request a power boost for increasing an electrical power production of the wind turbine;
using a model predictive control (MPC) routine:
calculate at least one predicted operational trajectory based on a current operational state of the wind turbine and a boost level of the boost command, the predicted operational trajectory comprising a time series of at least a first variable, wherein the least one predicted operational trajectory comprises a predicted kinetic energy in a rotor of the wind turbine; and
calculate at least one predicted control trajectory based on the predicted operational trajectory, the predicted control trajectory comprising a time series of at least a second variable, wherein during the power boost, the at least one predicted operational trajectory and the at least one predicted control trajectory are repeatedly calculated as receding horizon trajectories;
control the wind turbine using a last calculated control trajectory of the at least one predicted control trajectory during the power boost; and
determine a maximum boost period as a time period corresponding to a duration of the time series where the predicted kinetic energy in the rotor is larger than a predetermined value.

* * * * *